017
United States Patent [19]

Samonides

[11] 4,068,028
[45] Jan. 10, 1978

[54] APPARATUS AND METHOD OF PRODUCING TRANSPARENT LABELS WITH PRINTING ON THE ADHESIVE AND PRODUCT PRODUCED THEREBY

[75] Inventor: John Samonides, Streamwood, Ill.

[73] Assignee: Unical Corporation, Chicago, Ill.

[21] Appl. No.: 151,422

[22] Filed: June 9, 1971

[51] Int. Cl.$^2$ .............................................. E06B 9/26
[52] U.S. Cl. ...................................... 428/40; 40/7 R; 156/277; 156/289; 156/299; 156/384; 156/584; 428/43; 428/352
[58] Field of Search ................. 161/5, 6, 39, 167, 406, 161/413; 40/2 R, 125 A, 135; 156/63, 230–241, 277, 299, 289, 384, 584; 117/12–15, 122, 38, 45; 283/1, 18, 21; 428/40, 46, 48, 43, 352

[56] References Cited

U.S. PATENT DOCUMENTS

| 2,372,994 | 4/1945 | Welch | 40/2 |
| 3,013,917 | 12/1961 | Karlan et al. | 161/235 |
| 3,130,984 | 4/1964 | Fenberg | 283/1 |
| 3,276,933 | 10/1966 | Brant | 156/230 |

*Primary Examiner*—William A. Powell

*Attorney, Agent, or Firm*—Vogel, Dithmar, Stotland, Stratman & Levy

[57] ABSTRACT

A continuous web of sheet material including a transparent face sheet having a rear surface coated with a pressure-sensitive adhesive and a backing sheet releasably attached to the adhesive is fed to label-forming apparatus comprising de-laminating means for separating the backing sheet from the face sheet, a plurality of printing stations for printing multi-color indicia on the adhesive coating of the face sheet, steering and re-laminating mechanism for aligning the separated face and backing sheets and then re-laminating them so that the backing sheet completely covers the adhesive coating, die cutters for cutting discrete label portions and surrounding waste portions in the re-laminated face sheet, and means for removing the waste portions; in an alternative embodiment the face sheet is opaque, the de-laminating means being disposed between two adjacent printing stations, the printing stations upstream of the de-laminating mechanism printing first indicia on the front surface of the face sheet, and the printing stations downstream of the de-laminating mechanism printing second indicia on the adhesive coating of the face sheet.

7 Claims, 12 Drawing Figures

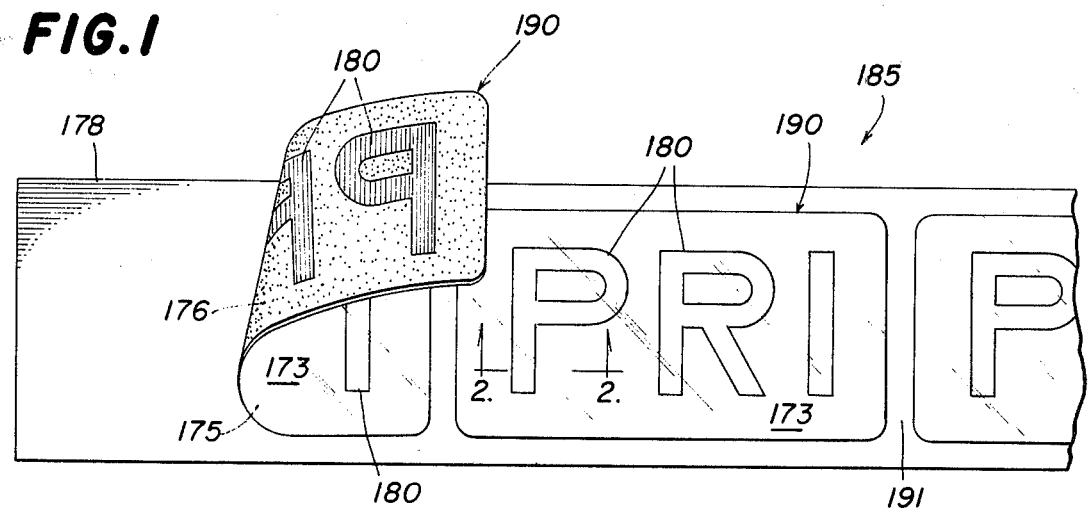
FIG. 1
FIG. 2
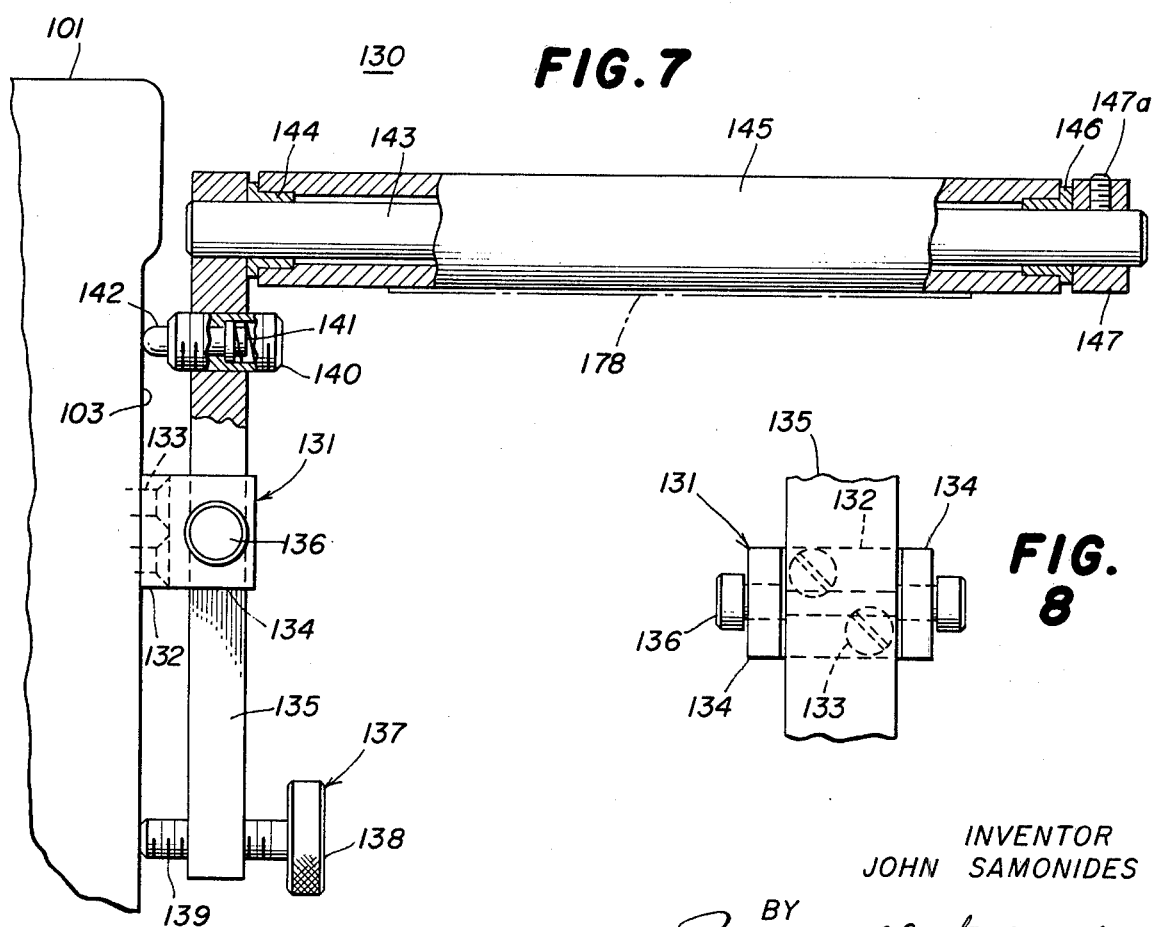
FIG. 7
FIG. 8
INVENTOR
JOHN SAMONIDES
BY
Prangley, Clayton, Mullin,
Dithmar & Vogel ATTYS.

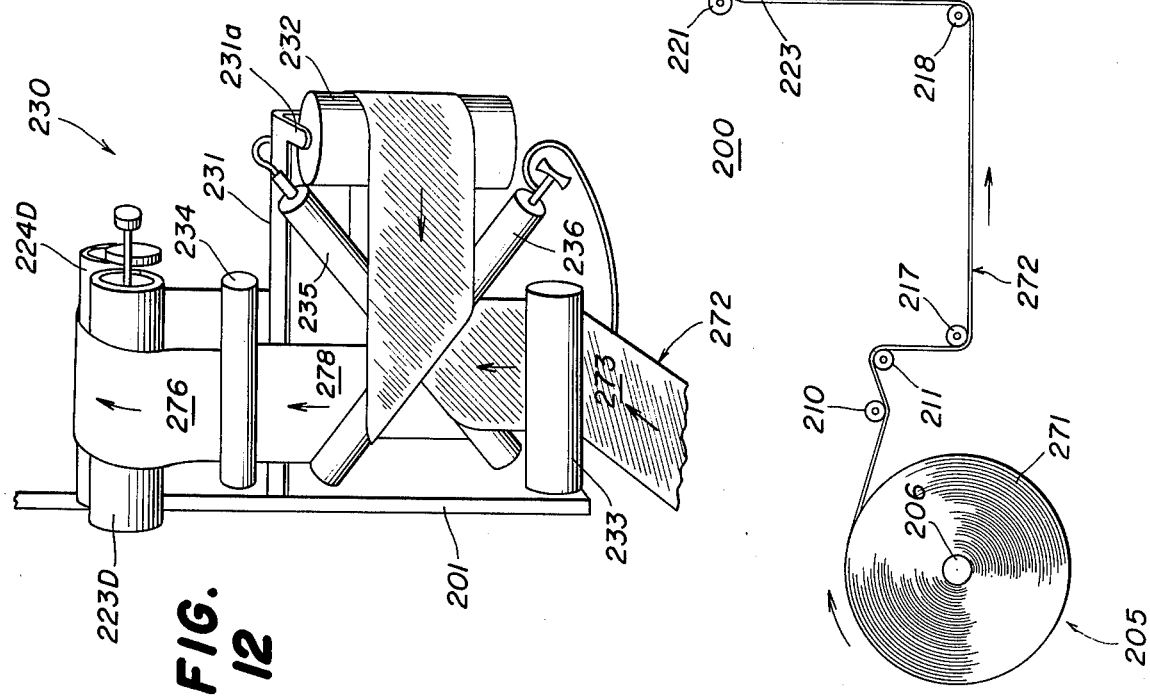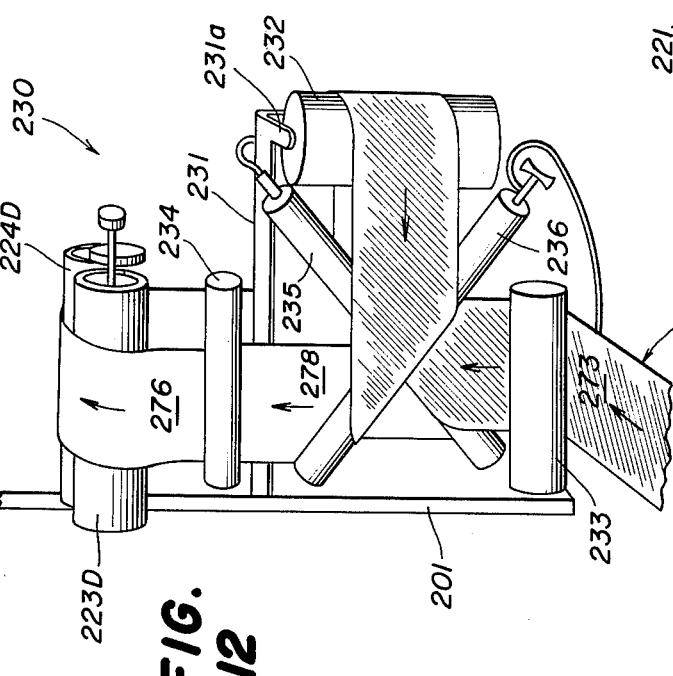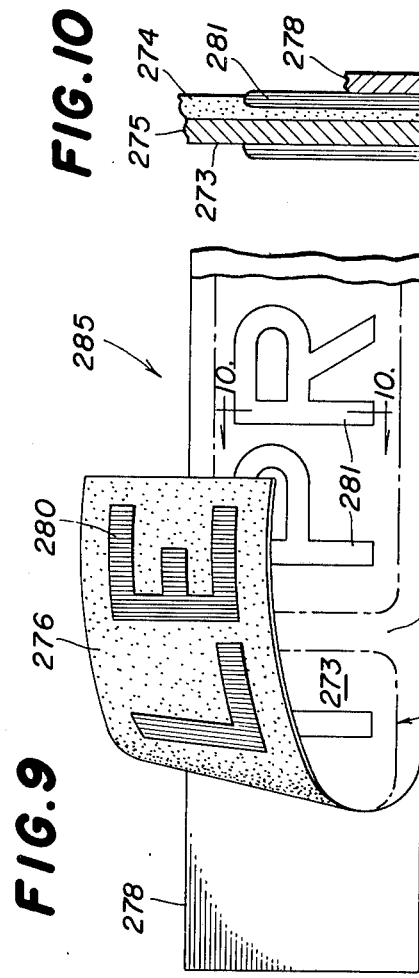

APPARATUS AND METHOD OF PRODUCING TRANSPARENT LABELS WITH PRINTING ON THE ADHESIVE AND PRODUCT PRODUCED THEREBY

The present invention relates to a method and apparatus for forming adhesive-backed labels having printed indicia on the adhesive. Further, the present invention relates to the label product produced by this method and apparatus.

More particularly, it is a general object of this invention to provide an apparatus and method for de-laminating a sheet material comprising a face sheet having an adhesive coating on the rear surface thereof and a backing sheet attached to and covering the adhesive coating, and for printing indicia on either or both of the adhesive coating and the front surface of the face sheet and then re-laminating the face sheet and the backing sheet to provide printed label material.

It is an important object of the present invention to provide a sheet material for use in forming labels and the like, the sheet material comprising a continuous transparent face sheet having a front surface and a rear surface, a coating of adhesive on the rear surface of the face sheet for mounting the face sheet on an associated support surface, printing material impressed on the adhesive coating to form printed indicia thereon visible through the face sheet from the front side thereof, a continuous backing sheet releasably attached to the rear surface of the face sheet by the adhesive and completely covering the adhesive along the entire length of the face sheet, the adhesive adhering more firmly to the rear surface of the face sheet than to the backing sheet for facilitating removal of the backing sheet to expose the adhesive, whereby upon removal of the backing sheet from the adhesive the face sheet provides label material bearing printed indicia which are protected in use by the face while being visible therethrough.

In connection with the foregoing object, it is another object of this invention to provide a sheet material of the type set forth, which includes a plurality of discrete transparent face sheet segments arranged generally in end-to-end relationship to define an elongated string of the segments interconnected and carried by the backing sheet, each of the discrete face sheet segments having printing material impressed on the adhesive coating thereof to form individual printed labels.

It is another object of this invention to provide a sheet material for use in forming labels and the like, the web of sheet material comprising a continuous opaque face sheet having a front surface and a rear surface, a coating of adhesive on the rear surface of the face sheet for mounting the face sheet on an associated support surface, first printing material impressed on the front surface of the face sheet to form first printed indicia thereon, second printing material impressed on the adhesive coating to form second printed indicia thereon, a continuous backing sheet releasably attached to the rear surface of the face sheet by the adhesive and completely covering the adhesive along the entire length of the face sheet, the adhesive adhering more firmly to the rear surface of the face sheet than to the backing sheet for facilitating removal of the backing sheet to expose the adhesive, whereby on removal of the backing sheet from the adhesive the face sheet provides label material bearing printed indicia on both sides thereof.

In connection with the foregoing object, it is another object of this invention to provide sheet material of the type set forth, wherein said face sheet comprises a plurality of discrete face sheet segments arranged generally in end-to-end relationship to define an elongated string of the segments interconnected and carried by the backing sheet, each of the face sheet segments having the first and second printing indicia thereon to form individual labels.

Still another object of this invention is to provide a method of forming printed labels from a continuous web of sheet material including a transparent face sheet having a front surface and an adhesive-coated rear surface and a backing sheet releasably attached to and completely covering the adhesive-coated rear surface and readily removable therefrom, the method comprising the steps of separating the backing sheet from the adhesive-coated face sheet, printing indicia on the adhesive coating of the separated face sheet, laterally positioning the separated backing sheet with respect to the printed face sheet so that the backing sheet is arranged completely to cover the adhesive coating on the face sheet, and thereafter re-attaching the positioned backing sheet to the printed adhesive coating on the face sheet for completely covering the adhesive coating, whereby upon subsequent removal of the backing sheet from the adhesive-coated face sheet the face sheet provides label material bearing printed indicia which are protected in use by the face sheet while being visible therethrough.

In connection with the foregoing object, it is another object of this invention to provide a method of the type set forth, wherein the face sheet is opaque, and further including the step of printing first indicia on the front surface of the face sheet prior to separation of the face sheet from the backing sheet.

Yet another object of this invention is to provide apparatus for forming printed labels from a continuous web of sheet material including a transparent face sheet having a front surface and an adhesive-coated rear surface and a backing sheet releasably attached to and completely covering the adhesive-coated rear surface and readily removable therefrom, the apparatus comprising a support frame, delaminating means mounted on the frame for receiving the continuous web of sheet material from an associated supply thereof and separating the backing sheet from the adhesive-coated face sheet, the de-laminating means directing the face sheet along a first path and directing the backing sheet along a second path, printing mechanism carried by the frame and disposed in engagement with the face sheet along the first path for printing indicia on the adhesive coating of the face sheet, a steering roller mounted on the frame for tilting movement about a tilt axis disposed substantially normal to the longitudinal axis of the steering roller and disposed in engagement with the separated backing sheet for lateral positioning thereof, tilt mechanism coupled to the steering roller for effecting tilting movement thereof in opposite directions with respect to the tilt axis, movement of the steering roller by the tilt mechanism in one of the opposite directions effecting lateral movement of the backing sheet in a first direction with respect to the second path, movement of the steering roller in the other of the opposite directions by the tilt mechanism effecting lateral movement of the backing sheet in a second direction with respect to the second path, a pair of relaminating rollers disposed downstream of the printing mechanism and the steering roller and receiving the steered backing sheet and the printed face sheet therebetween for re-attaching the backing sheet to the adhesive-coated surface of the face sheet with the backing sheet completely covering the adhesive coating, a die cutter for cutting the re-attached face sheet to form discrete spaced-apart label portions thereof surrounded by waste portions thereof, and waste removal apparatus for removing the waste portions of the face sheet from the backing sheet thereby to leave discrete spaced-apart printed label portions attached to and carried by the backing sheet, whereby upon subsequent removal of the backing sheet from one of the discrete label portions of the face sheet the one label portion provides a discrete label bearing printed indicia which are protected in use by the face sheet while being visible therethrough.

In connection with the foregoing object, it is another object of this invention to provide apparatus of the type set forth, wherein the face sheet is opaque, and further including printing mechanism carried by the frame for printing first indicia on the front surface of the face sheet prior to separation thereof from the backing sheet by the de-laminating means.

Further features of the invention pertain to the particular arrangement of the parts of the sheet material and apparatus and the steps of the method whereby the above-outlined and additional operating features thereof are attained.

The invention, as to its organization and method of operation, together with further objects and advantages thereof, will best be understood by reference to the following specification taken in connection with the accompanying drawings, in which:

FIG. 1 is a top-plan view of a portion of a strip of label material constructed in accordance with and embodying the features of a first embodiment of the present invention, with one of the discrete labels shown partially peeled from the backing sheet;

FIG. 2 is an enlarged fragmentary view in vertical section taken along the line 2—2 in FIG. 1;

in FIG. 3;

in FIG. 3;

FIG. 7 is an enlarged fragmentary and elevational view in partial section of the steering assembly of the apparatus of FIG. 3;

FIG. 8 is a fragmentary side elevational view of the pivot coupling of the steering assembly, as viewed from the right hand side of FIG. 7;

FIG. 9 is a top-plan view, similar to FIG. 1, of a portion of a strip of label material constructed in accordance with and embodying the features of a second embodiment of the present invention;

FIG. 10 is an enlarged fragmentary view in vertical section taken along the line 10—10 in FIG. 9;

FIG. 11 is a diagrammatic side elevational view of label-forming apparatus constructed in accordance with and embodying features of a second embodiment of the present invention; and FIG. 12 is an enlarged perspective view of the turn bar assembly of the label forming apparatus illustrated in FIG. 11.

Figures 3, 4, 5, 6:
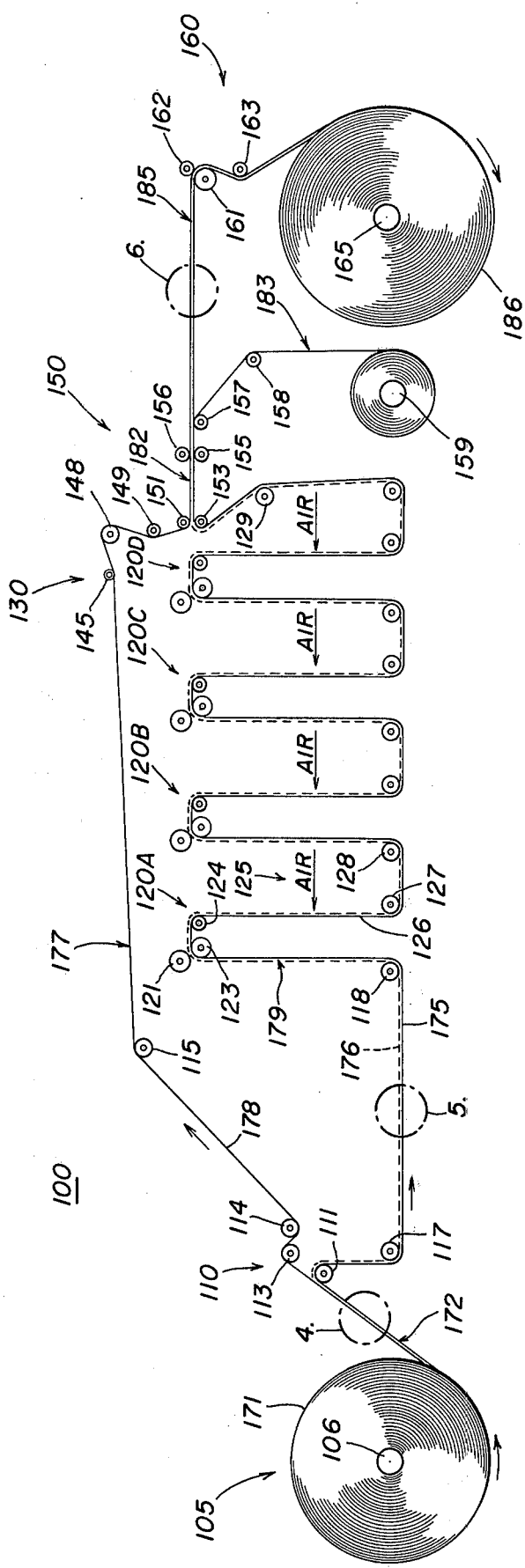
FIG. 3 is a diagrammatic side elevational view of label forming apparatus constructed in accordance with and embodying the features of a first embodiment of the present invention.
FIG. 4 is an enlarged fragmentary view in vertical section of a portion of the sheet material web designated by the numeral 4.
FIG. 5 is a view similar to FIG. 4 of a portion of the face sheet material web designated by the numeral 5.
FIG. 6 is a view similar to FIG. 4 of a portion of the printed label material web designated by the numeral 6 in FIG. 3.

Referring now more particularly to FIGS. 1 through 8 of the drawings, there is shown a label-forming press, generally designated by the numeral 100, constructed in accordance with a first embodiment of the present invention. The label-forming press 100 comprises a four-color printing press which is a modified version of the model "650" Four-Color Tag and Label Press manufactured by the Webtron Corp. The press 100 receives a continuous web of composite laminated sheet material 170 which includes a face sheet and a backing sheet releasably attached to the face sheet by a pressure-sensitive adhesive, and then impresses printed indicia on the adhesive, all in a manner to be described in greater detail hereinafter. The press 100 includes a support frame 101 (see FIG. 7) for supporting the press mechanism, the frame 101 rotatably supporting thereon an unwind stand generally designated by the numeral 105, and having a shaft 106 extending outwardly from the frame 101 for receiving thereon a supply roll 171 of the sheet material 170, the roll 171 being mounted on the shaft 106 so that the leading end of the sheet material web 172 is unwound from the bottom of the roll 171.

Referring to FIG. 4, it will be seen that the sheet material 170 comprises a transparent face sheet 175, preferably formed of an acrylic resin such as that sold under the trade name "Mylar", the face sheet 175 having an outer or front surface 173 and a rear surface 174. The rear surface 174 of the face sheet 175 is coated with a layer of pressure-sensitive adhesive 176 which firmly adheres to the face sheet 175; adhesive 176 is preferably of the acrylic type sold under the trade designation "S232", and has permanent tackiness and is non-yellowing in character when subjected to ultra-violet radiation. Releasably attached to the face sheet 175 by the adhesive 176 is a backing sheet 178, preferably formed of 90 lb. white kraft paper carrying a silicone coating and adhering only lightly to the adhesive 176, whereby the backing sheet 178 may be readily peeled from the adhesive 176 without removing the adhesive from the face sheet 175.

Carried by the frame 101, adjacent to the unwind stand 105 (to the right thereof as viewed in FIG. 3), is a de-laminating assembly, generally designated by the numeral 110, which includes a dancing roller 111 and two fixed idler rollers 113 and 114 disposed above the dancing roller 111 and substantially in horizontal alignment with each other. Disposed above and to the right of the fixed idler roller 114 is another idler roller 115. Disposed beneath the dancing roller 111 and to the right thereof are two substantially horizontally aligned and widely spaced-apart idler rollers 117 and 118, each of the rollers 117 and 118 being provided with a sandpaper covering on the outer surface thereof, the sandpaper preferably having a No. 220 grit.

In use, the web 172 is fed upwardly over the dancing roller 111, and at this point the backing sheet 178 is separated from the adhesive-coated face sheet 175. The separated backing sheet 178 forms a backing sheet web 177 which is fed upwardly over the idler roller 113 and beneath the idler roller 114 and then upwardly to the idler roller 115, as will be described in greater detail below. The separated face sheet 175 forms a face sheet web 179 which is fed downwardly beneath the sandpaper idler rollers 117 and 118, with the adhesive coating 176 in contact with the surfaces of the rollers 117 and 118.

Disposed to the right of the de-laminating assembly 110, as viewed in FIG. 3, and arranged generally in horizontal alignment with one another are four identical spaced-apart printing and drying stations, each generally designated by the numeral 120 and being respectively designated by the suffixes "A", "B", "C", and "D". Since all of the stations 120A through 120D are identically constructed, only the printing and drying station 120A will be described in detail. The printing and drying station 120 includes a platen or printing roller 121 and an impression or backing roller 123, the rollers 121 and 123 being arranged closely adjacent to each other for receiving the face sheet web 173 therebetween in printing engagement with the printing roller 121. Spaced a slight distance to the right of the impression roller 123 and substantially in horizontal alignment therewith is an idler roller 124 and substantially in horizontal alignment with the sandpaper idler rollers 117 and 118 are two idler rollers 127 and 128, each having a sandpaper covering on the outer surface thereof and being substantially identical to the rollers 117 and 118. Positioned substantially midway between the idler rollers 124 and 127 is drying apparatus, generally diagrammatically designated by the numeral 125, for forcing a stream of drying air in the direction of the arrow in FIG. 3 against the printed adhesive coating 176 of the printed face sheet web 179 along a drying reach 126 extending between the idler rollers 124 and 127. The printing and drying stations 120A through 120D are so arranged that the face sheet web 179 is fed sequentially therethrough in alphabetical order, as will be explained more fully below.

Mounted on the frame 101 above the printing station 120D is a steering assembly, generally designated by the numeral 130, for engaging and steering the backing sheet web 177 in a manner to be described below. Referring to FIGS. 7 and 8, the steering assembly 130 includes a generally clevis-shaped pivot bracket 131 including a base portion 132 secured to a bearing surface 103 on the frame 101 by suitable fasteners such as mounting screws 133. Integral with the base 132 and extending laterally outwardly therefrom substantially normal thereto is a pair of spaced-apart pivot arms 134 receiving therebetween an elongated and substantially vertically extending lever arm 135. The lever arm 135 is provided with an opening therethrough substantially midway between the ends thereof and disposed in alignment with corresponding openings in the pivot arms 134 and receiving therethrough a pivot pin 136, thereby to mount the lever arm 135 on the pivot bracket 141 for pivotal movement about the longitudinal axis of the pivot pin 136.

Carried by the lever arm 135 adjacent to the lower end thereof is a stop screw, generally designated by the numeral 137, including an enlarged circular head 138 having a knurled outer surface thereon and an elongated externally threaded shank 139 integral with the head 138 and extending therefrom coaxially therewith, the shank 139 being threadedly engaged in a complementary internally threaded opening through the lever arm 135. By manual rotation of the knurled head 138, the stop screw 137 may be moved axially between a fully extended condition wherein the head 138 is disposed in engagement with the lever arm 135 and a fully retracted condition wherein the free end of the shank 139 is withdrawn into the opening in the lever arm 135.

Carried by the lever arm 135 between the upper end thereof and pivot bracket 131 is an externally threaded bias stud 140 threadedly engaged in a complementary opening through the lever arm 135. The bias stud 140 is hollow and accommodates therein a coil compression spring 141, one end of the spring 141 bearing against the outer and of the stud 140 and the other end of the spring 141 bearing against the inner end of a plunger 142 which extends axially outwardly through a complementary opening in the inner end of the stud 140. The plunger 142 is axially movable with respect to the stud 140, the outer end of the plunger 142 being rounded and disposed in engagement with the bearing surface 103 on the frame 101. In use, the interaction among the bearing surface 103, the stud 140, the compression spring 141, and the plunger 142 serves to bias the lever arm 135 toward pivotal movement about the pivot pin 136 in a clockwise direction, as viewed in FIG. 7.

Received in a complementary opening in the upper end of the lever arm 135 is one end of a shaft 143 which extends outwardly from the lever arm 135 substantially normal thereto. Disposed in surrounding relationship with the shaft 143 adjacent to the outer side surface of the lever arm 135 is an annular bearing member 144 which is received within the adjacent end of a hollow steering roller 145 being disposed coaxially with the shaft 143 and in freely sliding engagement with the bearing member 144. Received in the outer end of the steering roller 145 is another bearing member 146 for rotatably supporting the outer end of the steering roller 145. Received in surrounding relationship with the outer end of the shaft 143, outwardly of the bearing member 146 and in engagement therewith is an annular locking collar 147 secured in place on the shaft 143 by means of a radially extending set screw 147(a), the locking collar 147 cooperating with the upper end of the lever arm 135 to hold roller 145 and the bearing members 144 and 146 in place therebetween. Disposed to the right of the steering roller 145 is an idler roller 148 for receiving the backing sheet from the steering roller 145 and guiding it toward an idler roller 149 disposed immediately below the idler roller 148.

Mounted on the frame 101 to the right of the printing station 120D and the steering assembly 130 is a re-laminating and cutting station, generally designated by the numeral 150. The station 150 includes a rubber re-laminating roller 151 and a driven laminating base roller 153, preferably constructed of metal and spaced a slight distance from the rubber re-laminating roller 151. Disposed to the right of the roller 153 substantially in horizontal alignment therewith is a rotary cutting die 155 which is spaced a slight distance below a driven die cutting base roll 156, preferably constructed of steel and cooperating with the cutting die 155 in a manner to be described hereinafter.

In use, the backing sheet web 177 is fed from the steering roller 145 over the idler roller 148, downwardly behind the idler roller 149 and thence between the re-laminating rollers 151 and 153. In like manner, the face sheet web 179 is fed from the printing station 120D over an idler roller 129 and thence between the re-laminating rollers 151 and 153, with the adhesive coating 176 facing the backing sheet web 177. The spacing between the re-laminating rollers 151 and 153 is such that the backing sheet web 177 is re-attached to the adhesive coating 176 on the face sheet web 179 to form a re-laminated web 182 of printed sheet material. The backing sheet web 177 is laterally guided by the steering assembly 130 to a position in proper registry with the face sheet web 179 so that when re-laminated therewith, the backing sheet web 177 completely covers the adhesive coating 176.

The re-laminated web 182 is then fed between the cutting die 155 and the base roller 156, the spacing therebetween being such that the cutting die 155 cuts through the face sheet 175 without cutting into the backing sheet 178. The cutting die 155 is so arranged as to cut the face sheet 175 to form generally rectangular longitudinally-spaced-apart label portions 190 therein surrounded by waste portions 191.

From the re-laminating and cutting station 150, the die cut web 182 is fed over a waste removal idler roller 157, at which point the waste portions of 191 of the face sheet 175 are stripped from the surrounded label portions 190 to form a web 183 of waste portion which is fed downwardly over another waste removal idler roller 158 to a waste take-up roller 159 on which the waste web 183 is wound.

Removal of the waste portions from the face sheet 175 provides a finished product label material web 185 which is then fed to a product re-wind assembly, generally designated by the numeral 160. The assembly 160 includes a web tension control drive roller 161, preferably constructed of steel, and a web tension control pinch roller 162, preferably constructed of rubber and disposed a predetermined distance above the drive roller 161. Disposed below the drive roller 161 is an idler roller 163. In use, the finished product web 185 is fed between the drive roller 161 and the pinch roller 162, the spacing therebetween being such that the web 185 is frictionally engaged therewith. The drive roller 161 then feeds the web 185 downwardly behind the idler roller 163 and thence to a product re-wind roll 165, which is powered for winding the product web 185 into a roll 186 thereon.

The operation of the label-forming press 100 will now be described in detail. Initially a supply roll 171 of sheet material 170 is mounted on the shaft 106 of the unwind stand 105 for rotation therewith, the roll 171 being mounted so that the leading end of the sheet material web 172 will be unwound from the bottom thereof, as illustrated in FIG. 3. The web 172 is fed from the unwind stand 105 upwardly over the dancing roller 111 which serves to automatically control the tension in the web 172. At the dancing roller 111, the backing sheet 178 is separated or de-laminated from the face sheet 175 to form the backing sheet web 179 which is guided upwardly over the fixed idler roller 113, then beneath the idler roller 114 and then upwardly over the idler roller 115 and toward the steering assembly 130. The separated face sheet 175 with the adhesive coating 176 thereon defines the face sheet web 179 which is fed downwardly beneath the sandpaper idler rollers 117 and 118 and thence upwardly to the first printing station 120A.

The web 179 is fed between the printing roller 121 and the backing roller 123 for receiving printed indicia of a first color thereon in a well-known manner, the adhesive coating 176 being disposed in engagement with the printing roller 121 so that the printed indicia are impressed on the adhesive coating 176. The printed web 179 is then fed over the idler roller 124 and downwardly along a drying reach 126 in front of the drying apparatus 125, the stream of air from the drying apparatus 125 serving to dry the printing ink on the adhesive coating 176. After passing the drying apparatus 125, the dried web 179 is then fed beneath the sandpaper idler rollers 127 and 128 and then upwardly to the second printing station 120B. The web 179 is fed through each of the printing stations 120B through 120D in the same manner as was described with regards to the printing station 120A, each of the printing stations printing a different color indicia on the adhesive coating 176, all of which colors will cooperate to define a finished printed indicia. The web 179 is fed from the last printing station 120D upwardly in front of the idler roller 129 and then between the re-laminating rollers 151 and 153, with the adhesive coating 176 disposed upwardly to face the roller 151, as illustrated in FIG. 3.

Simultaneously, the backing sheet web 177 is fed from the idler roller 115 beneath the steering roller 145 and thence over the idler roller 148 and downwardly behind the idler roller 149 and between the re-laminating rollers 151 and 153, with the web 177 engaging the adhesive coating 176 on the face sheet web 179. It is essential that when the webs 177 and 179 are re-attached by the re-laminating rollers 151 and 153, the webs be aligned in proper registry with each other so that the backing sheet web 177 completely covers the adhesive coating 176 permitting none of the adhesive coating to extend from beneath the backing sheet web 177. This is important since the adhesive 176 will strongly adhere to the rollers 151 and 153 and to the roller 156 and will thereby tend to jam the press 100.

In order to assure this proper registration of the webs 177 and 179, the steering assembly 130 may be adjusted during the operation of the press 100 to correct any deviation of the backing web 177 from proper registration. Thus, referring to FIG. 7, it will be appreciated that when the adjusting screw 138 is rotated in a direction for withdrawing the shank 139 axially to the right, as viewed in FIG. 7, this movement will accommodate a slight pivotal movement of the lever arm 135 in a clockwise direction under the urging of the compression spring 141 in the bias stud 140. This clockwise pivoting of the lever arm 135 effects a corresponding downward tilting of the outer end of the steering roller 145, thereby causing the backing sheet web 177 to track laterally to the left, as viewed in FIG. 7. Similarly, rotation of the stop member 138 in the opposite direction to effect axial extension of the shank 139 toward the bearing surface 103 will tend to move the lever arm 135 pivotally in a counter-clockwise direction against the urging of the compression spring 141. This counter-clockwise movement of the lever arm 135 effects a corresponding upward tilting of the outer end of the steering roller 145 thereby causing the backing sheet web 177 to track to the right, as viewed in FIG. 7.

As described above, the re-laminating rollers 151 and 153 urge the webs 177 and 179 into engagement with each other for re-attaching the backing sheet to the printed face sheet. Subsequently, the re-laminated web 182 passes between the die cutting rollers 155 and 156 for cutting discrete longitudinally spaced-apart label portion 190 from the face sheet 175, the surrounding waste portions of the face sheet 175 being guided over the idler rollers 157 and 158 and forming a waste web 183 which is taken up on the waste take-up roller 159.

It will be noted that preferably the indicia printed by the printing stations 120A through 120D comprise a repetitive pattern, the die cutting roller 155 being so arranged that each of the label portions 190 cut thereby comprises a single one of the repeating patterns of the printed indicia. After removal of the waste portions from the web 182, there remains a finished product web 185 which is illustrated in detail in FIG. 1, the web 185 comprising a string of spaced-apart discrete printed labels 190 interconnected and carried by the backing sheet 178.

Referring to FIG. 6, it will be noted that the printed indicia 180, which may be in the form of letters as indicated in FIG. 1, define bodies of printing ink which are impressed in the adhesive coating 176 but do not extend therethrough to the rear surface 174 of the face sheet 175. The finished product web 185 is fed between the tension control drive roller 161 and the pinch rollers 162 and thence downwardly behind the idler roller 163 to be wound into a roll 186 on the product rewind roller 165.

In use, the individual labels 190 may readily be peeled from the backing sheet 178 of the finished product web 185 for mounting on any desired support surface by means of the adhesive 176. It will be appreciated that when the label 190 is so mounted on a support surface, the printed indicia 180 are in effect buried in the adhesive coating 176 beneath the front surface 173 of the label 190. Thus, the printed indicia 180 are not susceptible to deterioration by abrasion or exposure to the elements, as would be the case with indicia printed on the front surfaces of the labels 190. Yet, while the indicia 180 are thus protected by the thickness of the label 190, they are nevertheless completely clearly visible from the front of the label 190 by reason of the transparency of the face sheet 175.

It will be understood that instead of winding the finished product web 185 into the roll 186, the web 185 could be sliced into a plurality of discrete labels 190, each provided with its own backing sheet 178. Further, while in the preferred embodiment of this invention, the labels are imprinted with four-colored indicia, it will be appreciated that indicia having fewer colors may be produced by by-passing one or more of the printing stations 120A through 120D.

Referring now to FIGS. 9 through 12 of the drawings, there is shown a second embodiment of the invention including a four-color label forming press, generally designated by the numeral 200, for forming printed labels from sheet material, generally designated by the numeral 270. The press 200 is similar to the press 100, and includes a main support frame 201 for supporting the remainder of the apparatus of the press 200 thereon. Mounted on one end of the frame 201 is an unwind stand, generally designated by the numeral 205, having a rotatable shaft 206 for receiving thereon a roll 271 of the sheet material 270, the roll 271 being mounted on the shaft 206 so that the leading end of the sheet material web 272 is unwound from the top of the roll 271, as illustrated in FIG. 11.

The sheet material 270 comprises an opaque face sheet 275, having a front surface 273 and a rear surface 274, the rear surface 274 having firmly secured therethrough a coating of pressure-sensitive adhesive 276. Preferably the face sheet 275 is an opaque paper carrying on one side thereof the adhesive layer 276 formed of a suitable acrylic adhesive which possesses permanent takiness and is non-yellowing when subjected to ultraviolet radiation. Disposed on the adhesive layer 276 is the backing sheet 278 formed of a 90 lb. white kraft paper provided with a silicone coating so as to be only lightly adhered to the adhesive layer 276. Thus, the backing sheet 278 may readily be peeled from the adhesive 276 without removing the adhesive from the face sheet 275.

The sheet material is 270 wound on the roll 271 so that the front surface 273 of the face sheet 275 is disposed upwardly as the web 272 is unwound from the roll 271.

Mounted on the frame 201 adjacent to the unwind stand 205 is a fixed idler roller 210 for receiving the web 272 therebeneath and guiding it to an adjacent pair of vertically spaced-apart dancing rollers 211 and 217. Disposed a predetermined distance to the right of the dancing roller 217 and arranged substantially in horizontal alignment therewith, as viewed in FIG. 11, is an idler roller 218 having the outer surface thereof coated with sandpaper. In use, the web 272 is fed from the idler roller 210 over the dancing roller 211 and then downwardly beneath the dancing roller 217 and the sandpaper idler roller 218, the dancing rollers 211 and 217 cooperating to automatically maintain the tension in the web 272.

Disposed to the right of the sandpaper idler roller 218 are spaced-apart identical printing and drying stations, respectively generally designated by the numerals 220A, 220B, 220C and 220D. Since the stations 220A through 220D are identically constructed, only the station 220A will be described in detail. The station 220A includes a platen or printing roller 221 spaced a predetermined distance from an impression or backing roller 223 for receiving therebetween the web 272 which is fed upwardly from the sandpaper idler roller 218. Spaced to the right of the backing roller 223 is an idler roller 224 and disposed to the right of the idler roller 218 substantially in horizontal alignment therewith are two spaced-apart idler rollers 227 and 228, each provided with a sandpaper coating on the outer surface thereof.

In use, the web 272 is fed between the rollers 221 and 223 with the front surface 273 of the face sheet 275 disposed in engagement with the printing roller 221, the space between the rollers 221 and 223 being such as to permit the imprinting of printed indicia on the front surface 273 of the face sheet 275. The printed web 272 is then fed from the printing rollers 221 and 223 over the idler roller 224 and downwardly along a drying reach 226 in front of drying apparatus, generally diagrammatically designated by the numeral 225. The drying station 225 produces a stream of drying air impelled in the direction of the arrow in FIG. 11 against the front surface 273 of the face sheet 275 for drying the printing ink thereon. The dried web 272 is then fed beneath the sandpaper idler rollers 227 and 228 and thence upwardly to the next printing and drying station 220B. In like manner, the web 272 is fed through the printing stations 220B and 220C for being printed with additional printed indicia thereby. Preferably, each of the printing stations 220A through 220C prints a different-colored portion of the printed indicia, all in a well-known manner.

Mounted on the frame 201 between the printing stations 220C and 220D is a turn bar assembly, generally designated by the numeral 230. The turn bar assembly 230 includes a mounting bracket 231 extending outwardly from the frame 201 and provided with vertically spaced-apart lugs or ears 231(a) at the outer end thereof for rotatably supporting therebetween a vertically extending idler roller 232. Mounted on the frame 201 inwardly and downwardly of the idler roller 232 is a horizontally extending input idler roller 233, a horizontally extending output idler roller 234 being mounted on the frame 201 above the idler roller 232 and substantially in vertical alignment with the idler roller 233.

Extending diagonally upwardly and outwardly from a point adjacent to the inner end of the input roller 233 to a point adjacent to the upper end of the vertical idler roller 232 is a first diagonal turn roll 235. Disposed forwardly of the turn roll 235 and extending diagonally upwardly and inwardly from a point adjacent to the lower end of the vertical idler roller 232 to a point adjacent to the inner end of the output idler roller 234 is a second diagonal turn roll 236.

In use, the printed web 272 is fed from the sandpaper idler roller 228 upwardly from beneath the input idler roller 234 of the turn bar assembly 230, with the printed front surface 273 of the face sheet 275 disposed in engagement with the input roller 234. The web 272 is then fed upwardly between the diagonal turn rolls 235 and 236 and over the former, the web 272 then being turned substantially 90° to the right, as viewed in FIG. 12, and fed forwardly around the vertical idler roller 232. The web 272 is then fed in front of and around the front diagonal turn roll 236 and is then turned upwardly substantially 90° behind the turn roll 236. At this point, it will be noted that the web 272 has been turned through 180°, i.e., the web has been obverted so that the backing sheet 278 is facing forwardly or upwardly. The obverted web 272 is then fed upwardly behind the output idler roller 234 and toward the printing station 220D.

Referring again to FIG. 11, the backing sheet 278 is separated from the face sheet 275 at the turn bar output idler roller 234, the face sheet 275 forming a face sheet web 279, which is directed toward the printing station 220D, while the backing sheet forms a backing sheet web 277, which is directed upwardly behind two vertically spaced-apart fixed idler rollers 240 and 241 which are mounted on the frame 201. The face sheet web 279 is fed between the rollers 221 and 223 of the printing station 220D, with the adhesive coating 276 disposed in printing engagement with the printing roller 221. Thus, single-color indicia is printed on the adhesive coating 276. After being dried by the drying apparatus of the printing station 220D, the web 279 is fed upwardly in front of an idler roller 229.

Simultaneously, the backing sheet web 277 is fed from the fixed idler roller 241 beneath a steering roller 245 of a steering assembly, generally designated by the numeral 230, which is identical to the steering assembly 130 in the label-forming press 100 described above. The web 277 is fed from the steering roller 245 upwardly over a fixed idler roller 242 and then downwardly behind an idler roller 243.

Mounted on the frame 201 between the idler rollers 229 and 243 is a re-laminating assembly, generally designated by the numeral 250. The re-laminating assembly 250 includes a rubber laminating roller 251 and a driven laminating base roll 252, preferably constructed of metal and spaced a pedetermined distance below the rubber roller 251. In use, the webs 277 and 279 are respectively fed from the idler rollers 243 and 229 to and between the re-laminating rollers 251 and 253, with the adhesive coating 276 of the web 279 facing the web 277 for engagement therewith. The spacing between the rollers 251 and 253 is such as to urge the webs 277 and 279 into engagement with each other for re-lamination thereof, to form a relaminated finished product web 285, the web 277 being steered by the steering assembly 230 into proper registration so that the backing sheet 278 completely covers the adhesive coating 276 on the face sheet web 279.

The product web 285 is fed from the re-laminating assembly 250 to a product rewind assembly, generally designated by the numeral 260, and including a web tension control drive roller 261, preferably formed of steel, and a web tension control pinch roller formed of rubber. The web 285 is fed between the tension control rollers 261 and 262 and then downwardly behind an idler roller 263 which is disposed a predetermined distance below the drive roller 261. The web 285 is then fed to a product rewind roller 265 which is powered for winding the web 285 into a finished product roll 286 thereon.

Referring to FIGS. 9 and 10, it will be seen that the finished product web 285 comprises a continuous strip of finished label material 290 printed on the front surface thereof with first indicia 280 and printed on the adhesive coating 276 thereof with second indicia 281, the label material 290 being releasably attached to and carried by the backing sheet 278. It will be seen from FIG. 10 that the indicia 281 form an ink body which is impressed in the adhesive coating 276, but does not extend therethrough to the rear surface 274 of the face sheet 275.

In use, the label material 290 is peeled from the backing sheet 278 and is affixed to any desired mounting surface by means of the pressure-sensitive adhesive coating 276. It will be appreciated that the label material 290 is particularly useful for attachment to transparent mounting surfaces such as windows and the like, whereby the indicia 281 on the adhesive coating 276 will be visible through the transparent mounting surface. In this application of the present invention, there will be provided a unique label material bearing first and second indicia which are respectively visible simultaneously from the opposite sides of a transparent mounting surface.

It will also be understood that die-cutting rollers such as the rollers 155 and 156 could be used in the press 200 between the re-laminating assembly 250 and the product rewind assembly 260 for cutting the face sheet 275 into discrete label portions surrounded by waste portions. Such discrete label portions are indicated in phantom in FIG. 9 and designated by the numeral 290, while the surrounding waste portions are designated by the numeral 291. It will be understood that in this case, the first and second indicia would normally form repetitive patterns arranged on the opposite sides of the face sheet 275 directly opposite each other. Further, in this case suitable waste take-up equipment such as that described with respect to press 100 above, would be provided to remove the waste portions of the face sheet 275 prior to winding the finished product web on the rewind roller 265. Furthermore, if desired, the finished product web 285 could be cut into a series of discrete individual labels, each provided with its own backing sheet, instead of winding the web in a continuous roll.

While the turn bar assembly 230 has been disclosed between the printing stations 220C and 220D, it will be appreciated that the turn bar assembly 230 could also be disposed between the printing stations 220A and 220B, or between the printing stations 220B and 220C. Thus, the press 200 could be arranged to provide first and second indicia 280 and 281 each having two colors, or to provide first indicia 280 having one color and second indicia 281 having three colors.

It will be understood that the face sheets 175 and 275 may be advantageously formed of other materials than those described above. The face sheet 175, for example, may advantageously be formed of cellulose acetate resin having a thickness of 0.002 inch, or a polyester resin having a thickness of 0.001 inch or a biaxially oriented polypropylene resin film having a thickness of 0.001 inch. In general, the thickness of the resin film may be in the range from about 0.0005 inch to 0.015 inch or greater. Other opaque films may be used in the place of that described above with respect to face sheet 275, the only requirement being that the film accept and hold the acrylic resin on the rear face thereof.

From the foregoing, it will be seen that there has been provided a novel method and apparatus for forming labels having indicia imprinted in the adhesive coating thereof. More particularly, there has been provided label-forming apparatus for producing either a continuous strip of label material or discrete individual labels.

Furthermore, there have been provided two embodiments of the label-forming method and apparatus, the first embodiment for imprinting indicia on the adhesive coating of the transparent face sheet of a laminated sheet material including an adhesive-coated face sheet and a releasable backing sheet, and the second embodiment for imprinting first indicia on the front surface of the face sheet and second indicia on the adhesive coating of the face sheet where the face sheet is opaque.

In addition, there have been provided two embodiments of novel label material as respectively produced by the two embodiments of label-forming apparatus.

Further, there has been provided novel web steering assembly for use in the label-forming apparatus and a unique arrangement of idler rollers for de-laminating and subsequently re-laminating the face sheet and backing sheet of the label material.

While there have been described what are at present considered to be the preferred embodiments of the invention, it will be understood that various modifications may be made therein, and it is intended to cover in the appended claims all such modifications as fall within the true spirit and scope of the invention.

What is claimed is:

1. A sheet material for use in forming labels, said sheet material comprising a continuous opaque face sheet having a front surface and a rear surface, a coating of adhesive on the rear surface of said face sheet for mounting said face sheet on an associated support surface, first printing material impressed on the front surface of said face sheet to form first printed indicia thereon visible only from the front side thereof, second printing material impressed on said adhesive coating and out of contact with said face sheet to form second printed indicia on said adhesive coating visible only from the rear side thereof, a continuous backing sheet releasably attached to the rear surface of said face sheet by said adhesive and completely covering said adhesive along the entire length of said face sheet, said adhesive adhering more firmly to the rear surface of said face sheet than to said backing sheet for facilitating removal of said backing sheet to expose said adhesive, whereby on removal of said backing sheet from said adhesive said face sheet provides label material bearing printed indicia on both sides thereof.

2. The sheet material set forth in claim 1, wherein said backing sheet is formed of silicone-coated white kraft paper.

3. The sheet material set forth in claim 1, wherein said face sheet is formed of polypropylene.

4. Sheet material set forth in claim 1, wherein said adhesive coating is a pressure-sensitive adhesive.

5. Sheet material set forth in claim 1, wherein at least one of said first and second printing materials has a plurality of different colors.

6. The sheet material set forth in claim 1, wherein said first and second printed indicia are respectively arranged to form first and second repetitive patterns along said face sheet, said first repetitive patterns being respectively positioned directly opposite said second repetitive patterns, whereby said printed face sheet may be severed between said repetitive patterns to form individual discrete labels bearing printed indicia on both sides thereof.

7. A sheet material for use in forming labels, said sheet material comprising a plurality of discrete opaque face sheet segments arranged generally in end-to-end relationship to define an elongated string of said segments, each of said segments having a front surface and a rear surface and including a coating of adhesive on said rear surface for mounting said segment on an associated support surface, first printing material impressed on the front surface of each of said segments to form first printed indicia thereon visible only from the front sides thereof, second printing material impressed on said adhesive and out of contact with said face sheet on each of said segments to form on said adhesive coating second printed indicia on said adhesive coating visible only from the rear side thereof, a continuous backing sheet commonly releasably attached to the rear surfaces of all of said segments by said adhesive and covering said adhesive on all of said segments thereby to form a strip of separable discrete face sheet segments interconnected and carried by said backing sheet, said adhesive adhering more firmly to the rear surfaces of said segments than to said backing sheet for facilitating removal of said backing sheet to expose said adhesive, whereby upon removal of said backing sheet from said adhesive on one of said face sheet segments said one segment provides an individual label-bearing printed indicia on both sides thereof.

* * * * *

UNITED STATES PATENT AND TRADEMARK OFFICE
CERTIFICATE OF CORRECTION

PATENT NO. : 4,068,028
DATED : January 10, 1978
INVENTOR(S) : John Samonides

It is certified that error appears in the above-identified patent and that said Letters Patent are hereby corrected as shown below:

[56] References Cited - The following U.S. patent references should be inserted:

```
--1,005,696  10/1911  Czettel
  1,847,390   3/1932  Finn
  1,969,569   8/1934  Malocsay
  2,046,924   7/1936  Pendergast
  2,302,179  11/1942  Bronfman
  3,106,032  10/1963  Morgan
  3,453,165   7/1969  Isbey et al.
  3,664,910   5/1972  Hollie
  3,692,610   9/1972  Kornstein--.
```

Column 1, line 38, after "face" insert --sheet--.
Column 5, line 15, "173" should be --179--.
Column 7, line 15, after "portions" delete "of".

Signed and Sealed this

Twenty-third Day of May 1978

[SEAL]

Attest:

RUTH C. MASON
Attesting Officer

LUTRELLE F. PARKER
Acting Commissioner of Patents and Trademarks